United States Patent [19]

Koto

[11] 4,450,454

[45] May 22, 1984

[54] SMALL SIZE INK JET PRINTER

[75] Inventor: Haruhiko Koto, Shiojiri, Japan

[73] Assignees: Epson Corporation, Nagano; Kabushiki Kaisha Suwa Seikosha, Tokyo, both of Japan

[21] Appl. No.: 323,008

[22] Filed: Nov. 19, 1981

[30] Foreign Application Priority Data

| | | | |
|---|---|---|---|
| Nov. 20, 1980 | [JP] | Japan | 55-166517[U] |
| Nov. 20, 1980 | [JP] | Japan | 55-166518[U] |
| Nov. 21, 1980 | [JP] | Japan | 55-167247[U] |
| Nov. 21, 1980 | [JP] | Japan | 55-167250[U] |
| May 12, 1981 | [JP] | Japan | 56-68317[U] |

[51] Int. Cl.[3] .......... G01D 15/18

[52] U.S. Cl. .......... 346/140 R; 400/126

[58] Field of Search .......... 346/140 R; 400/126

[56] References Cited

U.S. PATENT DOCUMENTS

| | | | |
|---|---|---|---|
| 3,346,869 | 10/1967 | Stone | 346/140 X |
| 4,001,839 | 1/1977 | Kraus | 346/140 X |
| 4,045,802 | 8/1977 | Fukazawa | 346/140 |
| 4,369,454 | 1/1983 | Kyogoku | 346/140 |

FOREIGN PATENT DOCUMENTS

| | | | |
|---|---|---|---|
| 48007 | 7/1980 | Fed. Rep. of Germany | 400/126 |

*Primary Examiner*—Joseph W. Hartary
*Attorney, Agent, or Firm*—Blum, Kaplan, Friedman, Silberman & Beran

[57] ABSTRACT

A small size ink jet printer includes a cover which presses against the ink nozzle openings when the printer is inoperative. The printer head is electrically driven but operation of the nozzle cover is at least partially performed manually. Particularly, the nozzle covering operation which needs a large force, is often manually performed to conserve energy and reduce component size. Circuits detecting and responding to an inadvertent failure to cover the nozzles are also provided.

14 Claims, 19 Drawing Figures

FIG. 1
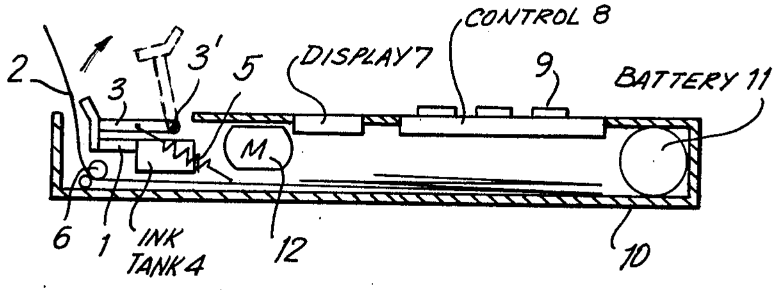
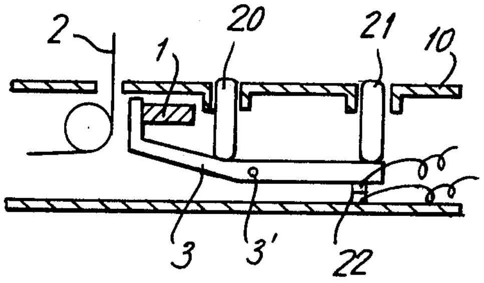
FIG. 2

FIG. 3
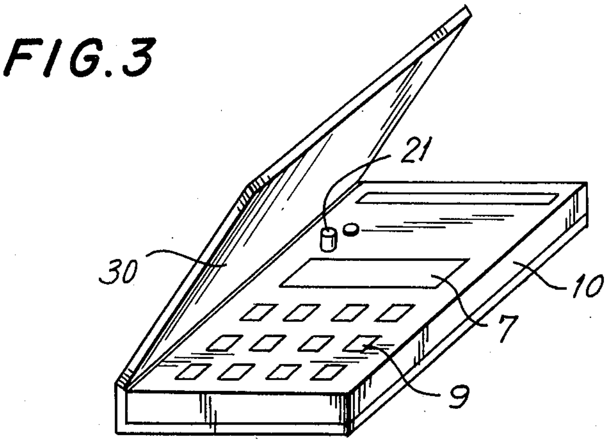
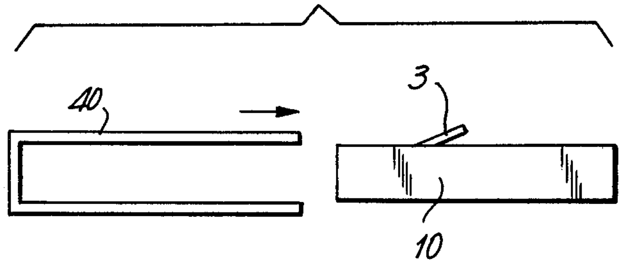
FIG. 4

FIG. 5
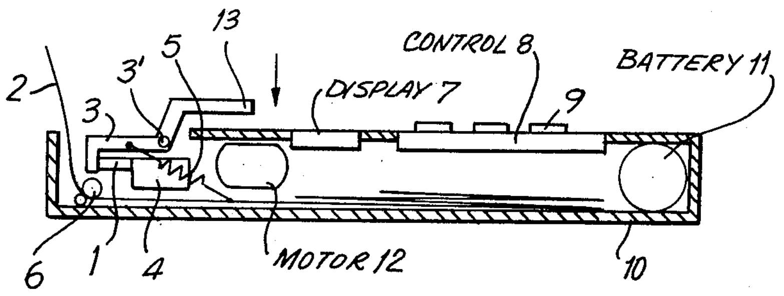
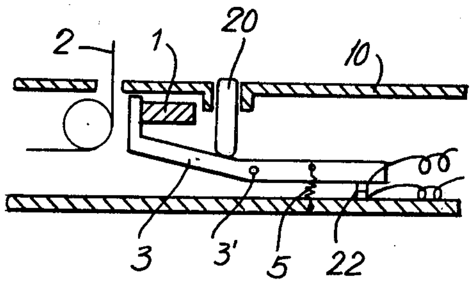
FIG. 6

FIG. 7a
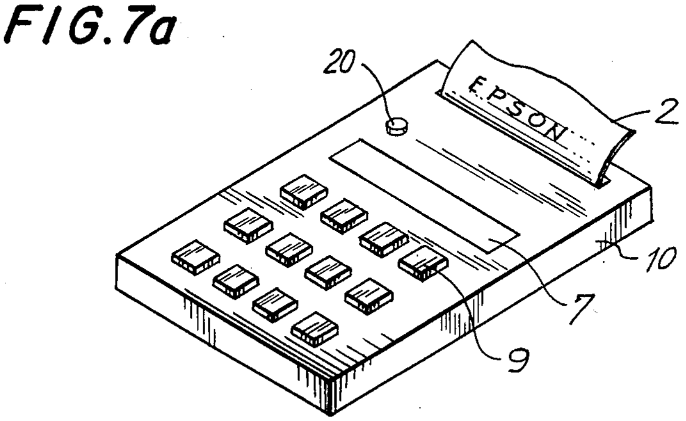
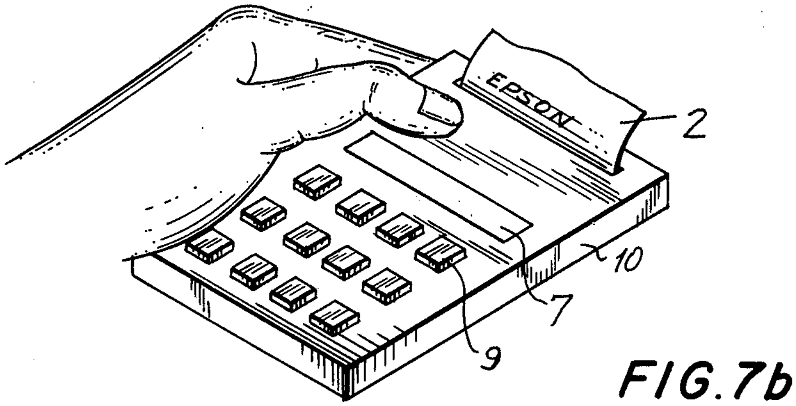
FIG. 7b
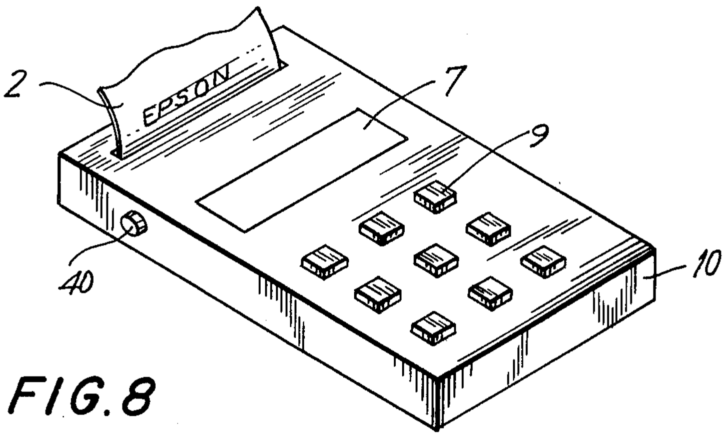
FIG. 8

FIG. 9
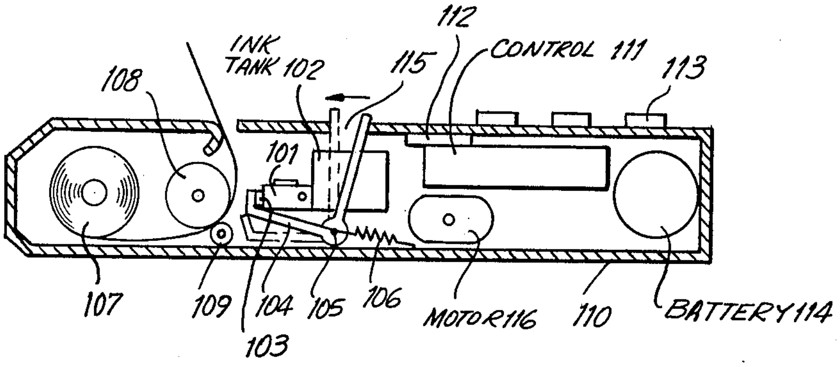
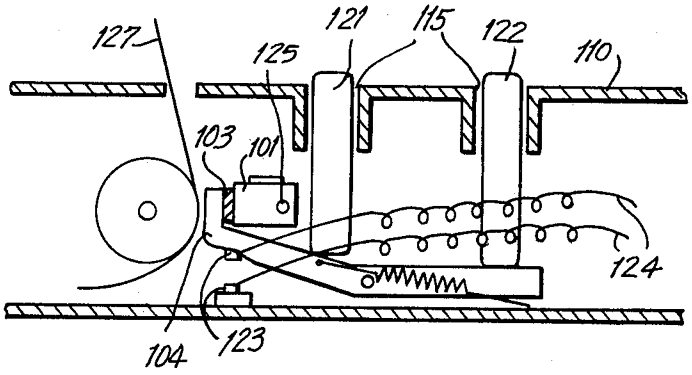
FIG. 10

FIG. 11
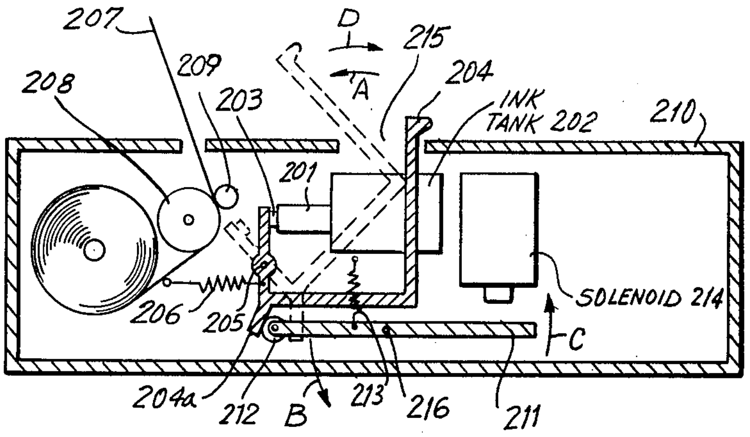
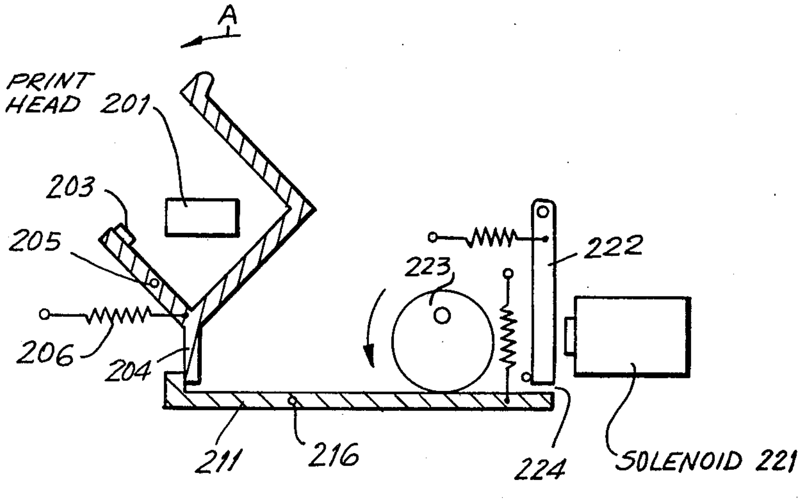
FIG. 12

FIG. 13
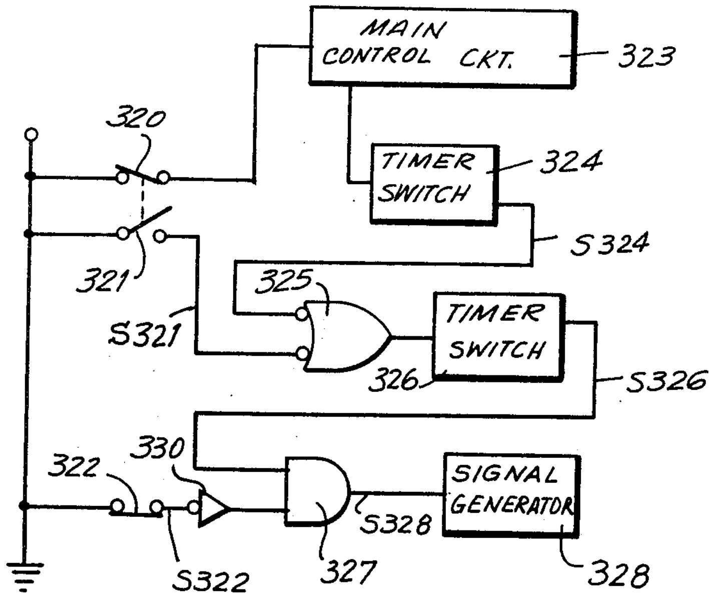
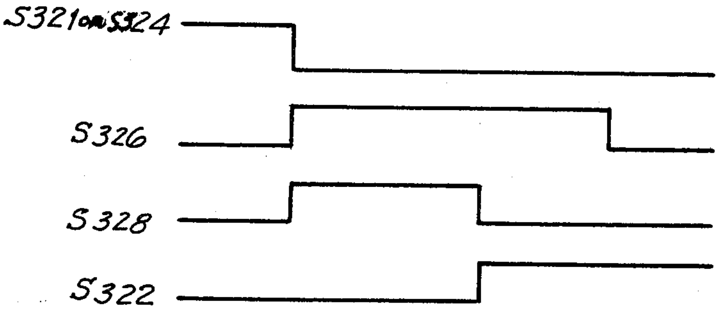
FIG. 14

FIG. 15
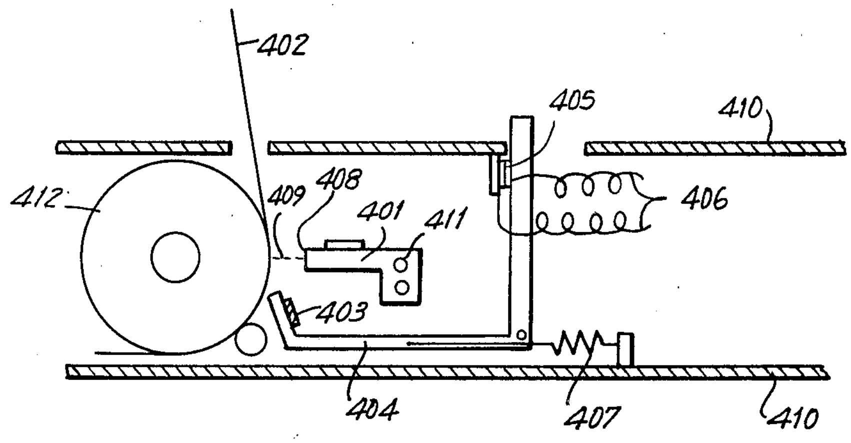
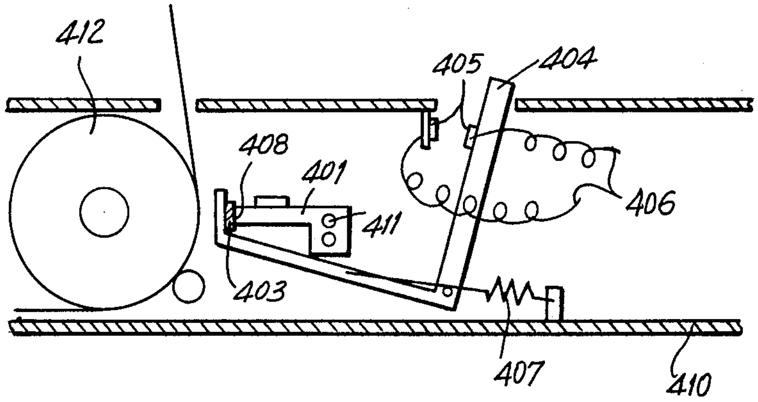
FIG. 16

FIG. 17
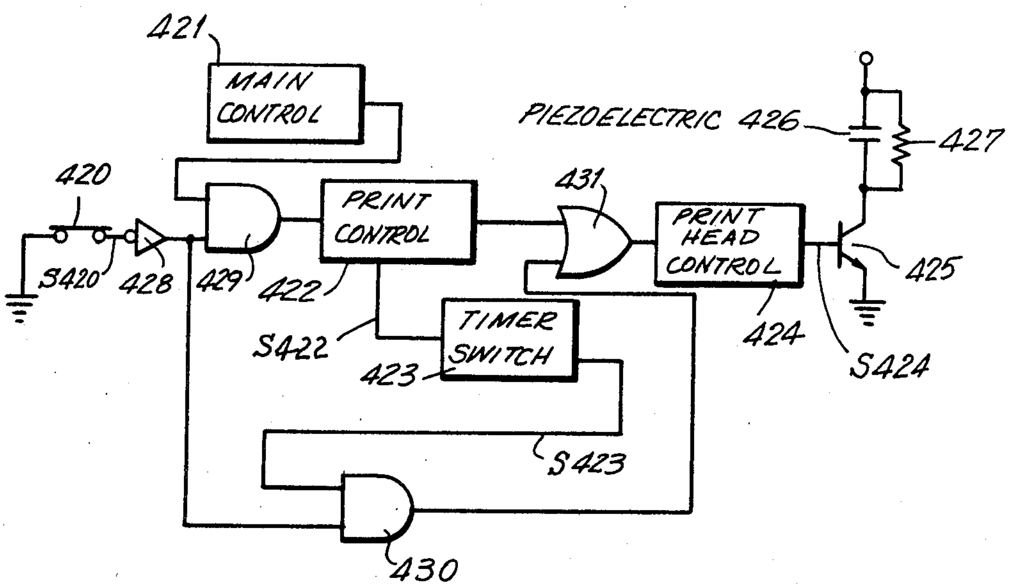
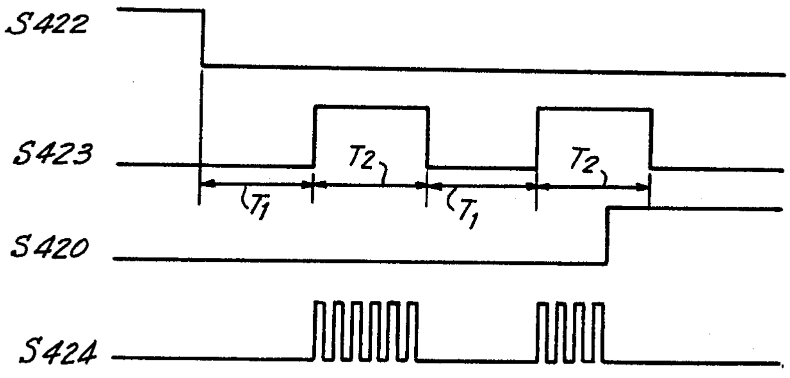
FIG. 18

SMALL SIZE INK JET PRINTER

BACKGROUND OF THE INVENTION

This invention relates generally to a printer which is small in size and more particularly, to a small sized ink jet type printer combining both electrical and manual operating procedures to assure extended operation with low power consumption. Ink jet printers of the ink-on-demand type require a small amount of energy for printing and hence, are advantageously operated by an internal battery. Such printers are used for portable printers such as an electronic desk top calculator. However, an ink jet printer has a disadvantage in that the nozzle end, having nozzles only several tens of microns in diameter, tends to become clogged with dried ink or with highly viscous ink. Such clogging renders the printer incapable of further operation. A conventional proposal for the prevention of nozzle clogging is to cover the front face, that is, discharge openings of the nozzles automatically with the aid of a solenoid when the printer is not used.

For complete elimination of nozzle clogging, it is necessary to hold the nozzle cover against the nozzle openings with considerable force. Such a large amount of force for pressing the nozzle cover against the nozzle openings is required also to prevent ink from flowing out of the nozzles when the portable printer is accidentally dropped and subjected to impact. Pocketsized calculator/printers must be carried without ink leakage also. Therefore, a relatively high level of energy is needed to properly cover the nozzle openings, thereby offsetting the advantage of low energy consumption for ejecting ink droplets for printing. In order to reliably press the nozzle cover against the nozzle openings, a drive source, such as a solenoid or an electrical motor, must be relatively large in size. As a result, the printer is costly to manufacture and not as small as is desirable.

What is needed is a an ink jet type printer which is protected against ink clogging and leakage without the consumption of large amounts of electrical energy or the use of large components.

SUMMARY OF THE INVENTION

Generally speaking, in accordance with the invention, an ink jet type printer especially suitable for portable applications and for the prevention of ink clogging or leakage is provided. The small sized ink jet printer includes a cover which presses against the ink nozzle openings when the printer is inoperative. The printer head is electrically driven but operation of the nozzle cover is at least partially performed manually. Particularly, the nozzle covering operation, which needs a large force, is often manually performed to conserve energy and reduce component size. Circuits detecting and responding to inadvertent failure of an operator to cover the nozzles are also provided.

Accordingly, it is an object of this invention to provide an improved small size ink jet printer having a cover for the ink jet nozzles which is, at least in part, manually operable.

Another object of this invention is to provide an improved small size ink jet printer having means to prevent the cover from being left open after printing is completed.

Another object of this invention is to provide an improved small size ink jet printer including alarm means to indicate when the nozzle cover is advertently left open.

Still another object of this invention is to provide an improved small size ink jet printer having means to automatically drive the ink jet print head after a selected time period has elapsed since printing operations have been completed and the nozzles are uncovered.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic sectional representation of a small size ink jet printer having a nozzle cover mechanism in accordance with the invention;

FIG. 2 is a partial sectional view of an alternative embodiment of a cover mechanism in accordance with this invention for a small size ink jet printer;

FIG. 3 is a perspective view of a small size ink jet printer including the cover mechanism of FIG. 2;

FIG. 4 schematically represents another alternative embodiment of a small size ink jet printer in accordance with the invention;

FIG. 5 is a cross-sectional view of a small size ink jet printer in accordance with the invention;

FIG. 6 is a partial cross-sectional view of an alternative embodiment of a small size ink jet printer in accordance with the invention;

FIGS. *7a,b* are perspective views of an alternative embodiment of a small size ink jet printer in accordance with this invention incorporating the mechanism of FIG. 6;

FIG. 8 is a perspective view of an alternative embodiment of a small size ink jet printer in accordance with the invention;

FIG. 9 is a side sectional view of a small size ink jet printer in accordance with the invention;

FIG. 10 is a partial sectional view of an alternative embodiment of a small size ink jet printer in accordance with the invention;

FIG. 11 is a side sectional view of a small size ink jet printer in accordance with this invention;

FIG. 12 is a partial sectional view of an alternative embodiment of a small size ink jet printer in accordance with the invention;

FIG. 13 is a functional schematic of a control circuit for the mechanism of FIG. 10 in accordance with the invention;

FIG. 14 shows waveforms associated with the circuit of FIG. 13;

FIGS. 15 and 16 are partial sectional views of a small size ink jet printer in accordance with this invention;

FIG. 17 is a functional circuit associated with the mechanism of FIGS. 15,16; and FIG. 18 are timing waveforms associated with the circuit of FIG. 17.

DESCRIPTION OF THE PREFERRED EMBODIMENTS

FIG. 1 schematically shows a mechanism for bringing a nozzle cover into and out of contact with the nozzles in an ink jet printer. The printer includes a printing head 1, recording paper 2, which is stored in the form of a folded fan in the Figure, nozzle cover 3, ink tank 4, spring 5, paper feed roller 6, display unit 7, control circuit 8, input switches 9, casing 10, electrical cell 11, and a motor 12.

In a printing operation, the nozzle cover 3 is manually moved in the direction of the arrow by pivoting of the cover 3 about a pin 3' as indicated with the broken lines of FIG. 1. The force of the spring 5 holds the cover 3 in either one of two stable positions. Thus, when the cover 3 is in the position indicated with the broken lines it is stable in that condition, and it is also stable when the cover 3 is over the nozzle openings in the printing head 1 as shown in the solid lines. With the parts positioned so that the nozzles are not covered by the cover 3, the control circuit 8 drives the printing head 1 to effect recording on the recording paper 2. The motor 12 is energized by the cell 11 to drive the carriage of the printing head 1 across the paper 2 and to operate the paper feed roller 6 to advance the paper, and to perform other operations related to printing.

When no further printing is required after recording has been completed, the cover 3 is manually pressed against the printing head 1 (solid line position) to thereby prevent the printing head from becoming clogged with ink and preventing ink from flowing out of the printing head 1. Even when a very strong spring 5 is used so as to reliably press the cover 3 against the printing head 1, no energy is consumed from the electrical cell for driving the cover 3 into the nozzle closing position. Hence, no large sized motor and no solenoid is necessary for actuating the cover. Both energy and space are conserved.

To guard against the situation where the operator forgets to close the cover after printing has been completed, the cover 3 projects substantially out of the casing 10 as indicated in the broken line position of FIG. 1. With such an arrangement of parts, the condition where the nozzle cover remains unapplied is easily recognized. Since the overall device becomes awkward if carried without the nozzle cover being in the closed position, there is markedly less possibility for someone to carry the device without first closing the cover. Thus, the possibility of a person staining his clothes or the device with ink is substantially reduced.

FIG. 2 is an alternative embodiment of an ink cover mechanism in accordance with the invention. Therein, a cover 3 is brought into and out of contact with a printing head 1 by means of a cover releasing button 20 and a cover pressing button 21. Manually pressing on the button 20 from outside the case 10 causes the cover mechanism 3 to pivot about a central pin 3' such that the printing head 1 is uncovered. Pressing on the button 21 returns the cover 3 to the closed position as shown in FIG. 2. Electrical contacts 22 detect whether the cover 3 is in or out of contact with the printing head 1, and these contacts also serve as a switch for the printing device. The cover 3 has different lever arms and leverages when actuated by the cover releasing button 20 as compared to actuation by the cover pressing button 21, such that the cover pressing button 21 projects substantial out of the casing 10 when the cover 3 is released. Accordingly, the uncovered condition of the nozzle is readily visible.

FIG. 3 shows a printer wherein the mechanism of FIG. 2 is incorporated. The button 21 extends substantially beyond the casing 10 indicating that the cover 3 is not closing the nozzles of the printing head 1. A cover member 30, mounted hingedly on the casing 10, is closed when the printer is carried. In closing the cover member 30, the cover pressing button 21 is depressed by the cover member 30 as the latter is closed and thereby the nozzles of the print head 1 are covered. Thus, it is unlikely that the printer would be carried with the cover 30 open and with a corresponding hazard of ink leakage or clogging with time.

In an alternative embodiment as shown in FIG. 4, a portion of the cover mechanism 3 extends from the casing 10 when the printing head is uncovered. A sleeve type external cover 40, when slipped over the printer in the direction of the arrow, depresses the cover element 3 and causes the nozzle openings to be protected.

In summary, in the small size ink jet printers in accordance with the invention, a cover pressing member is arranged so as to project substantially from the casing when the printing head is uncovered. Thus, the operator is unlikely to leave the nozzle cover in an open state when the printer is not in use thereby preventing the print head from becoming clogged and not permitting ink to fly unintentionally from the print head. Since the cover is reliably closed, especially when the device is to be carried, the carrier's clothes are not stained with ink which leaks. The nozzle cover is manually pressed into position with a high force which is provided without using the electrical energy stored in the battery. Thus, this concept is highly advantageous when applied to a small size battery powered device including a printer.

FIG. 5 schematically illustrates a mechanism for bringing a cover into and out of contact with a nozzle in an ink jet printer. The printer mechanism is part of a small sized pocket calculator. The calculator includes a printing head 1, recording paper 2 which is stored in a fan-folded condition, nozzle cover 3, an ink tank 4, spring 5, paper feed roller 6, display unit 7, control circuit 8, input switches 9, casing 10, electrical cell 11, motor 12 and an external lever 13, integral with the cover 3 for releasing the nozzle cover 3.

In a printing operation, the release lever 13 is depressed with a finger for pivoting movement about a pin 3' in the direction of the arrow. This causes the cover 3 to be removed from contact with the printing head 1. With the parts thus positioned, the control circuit 8 drives the printing head to effect recording of characters on the recording paper 2. The motor 12 is energized by the electrical cell 11 to drive a carriage (not shown) of the printing head across the surface of the paper and also to rotate the feed roller to advance the paper.

When printing is completed, finger pressure which has been applied to the lever 13 is released allowing the cover 3 to be pivoted by the force of the spring 5 such that the cover 3 presses against the printing head. Thereby, ink is prevented from clogging the printing head and from flowing out of the printing head. As before, a strong spring 5 is used for reliably pressing the nozzle cover 3 against the printing head 1 but no energy in the electrical cell is consumed in the process of driving the cover. Hence, no large size motor and no solenoid is necessary for actuating the cover 3. By releasing the finger after printing has been completed, the nozzle cover 3 is automatically pressed against the nozzles of the printing head 1 and there is no danger that the operator may forget to close the nozzle cover 3.

In another alternative embodiment (FIG. 6) a nozzle cover 3 is brought into and out of contact with a printing head 1 by manually pressing the external portion of a cover releasing button 20. This causes the nozzle cover 3 to pivot about a pin 3' thereby extending a spring 5. After printing is completed, pressure is released from the button 20 and the spring 5 returns the nozzle cover 3 to the closed position on the nozzles of the printing head 1. Electrical contacts 22 detect whether the cover 3 is in or out of contact with the printing head 1 and the contacts 22 also serve as a switch for the printing device.

FIGS. *7a,b* illustrate the mechanism of FIG. 6 as combined in a small size calculator/printer. Printing is possible only when the cover release button 20 (FIG. *7a*) is depressed with a finger (FIG. *7b*).

It will be readily understood that levers and buttons of various configurations and designs for releasing the nozzle cover are possible. As an example, a release button 40 may be positioned on a side of the device as illustrated in FIG. 8. The cover release means, and cover pressing means can be formed of a plastic material or be fabricated from other materials.

In summary, the small size ink jet printers of FIGS. 5-8, include a mechanism whereby the nozzle cover is automatically placed in the closed position after the printing operation has been completed so as to prevent the printing head from becoming clogged with ink and to prevent ink from flowing out of the printing head unintentionally. Because the cover is reliably closed, the operator's clothes are protected from becoming stained with ink especially when the device is carried. The nozzle cover is manually pressed and released. Therefore, no increase in energy consumption results from operation of the nozzle cover even when a high level of force is used in closing the nozzles.

FIG. 9 is another alternative embodiment of a small size ink jet printer in accordance with the invention. The printer includes an ink jet head 101, ink tank 102 for supplying ink to the ink jet head 101, cover 103 of rubber having anti-corrosive characteristic with respect to the printing ink, lever 104 on which the cover 103 is mounted, pin 105 on which the lever 104 is pivotable, spring 106, recording paper 107, platen 108, roller 109 for pressing against a paper 107, casing 110, electrical control circuit 111, liquid crystal display 112, push button switch 113, electrical battery cell 114, and a motor 116. A recess 115 is provided in the casing 110.

With such a construction, the lever 104 is in the position indicated with solid lines when the printer is not in operation. In this condition, the nozzle cover 103 is pressed against the front face of the ink jet head 101 to prevent the nozzles of the latter from becoming clogged with ink which is dried. In a printing operation, a portion of the lever 104 which projects out of the casing 110 through the recess 115, is pivoted manually in the direction of the arrow. The spring 106 is positioned with respect to the lever 104 and the pivot pin 105 such that the lever 104 has two stable positions. Thus, the lever 104 is caused to stay in the position indicated with the broken lines whereby the cover 103 is spaced away from the nozzles of the ink jet print head 101. Then, the push button switch 113 is depressed to actuate the control circuit 111 to cause an indication on the liquid crystal display 112 and also to energize the motor 116 to move the ink jet head 101 by means of a drive mechanism (not shown) under control of printing signals generated by the control circuit 111.

In accordance with the invention, (FIG. 9), the nozzle cover 103 is moved into and out of contact with the front face of the nozzles in the printing head 101 in response to manual operation effected externally of the casing 110. The cover 103 is held against the nozzle with a high level of force using the spring 106 without consuming energy from the electrical battery, as in the previous embodiments. Thus, the nozzles are reliably prevented from being clogged with ink and the ink is prevented from flowing out upon impact as when the printer is accidentally dropped, a situation which portable devices frequently experience.

Because there is no need for a complicated mechanism for automatically moving the nozzle cover into and out of contact with the nozzles, the printer can be manufactured with less cost and with a small overall size. The liquid crystal display is used in the foregoing embodiment because it consumes a small amount of energy and cooperates with the low energy consumption associated with use of ink jet printing to provide a longer service life for the battery.

FIG. 10 is an alternative embodiment of a small size ink jet printer in accordance with the invention, wherein the lever 104 is moved by a push button 121 extended through an opening in the casing 110 to bring the cover 103 out of contact with the front face of the nozzle of the ink jet print head 101. A closing push button 122 brings the cover 103 into contact with the front face of the nozzles of the ink jet head 101 to seal and to prevent clogging and leakage.

Electrical contacts 123 permit lead wires 124 to be electrically conductive at certain positions of the lever 104. The lead wires 124 are connected in circuit with a power supply for the printing device such that the mechanism for opening and closing the cover 103 serves as an actuation switch for the printing device. With the printing device incorporated in an electrical desk calculator, for example, the calculator can be energized by a main switch (not shown) for carrying out arithmetic operations, and the nozzle may be closed by the cover 103 when recording of information on the paper 127 is unnecessary as when the arithmetic operations are pursued. While the nozzle is closed by the cover 103, the printing device is not actuated and there is no danger of accidentical application of power, which might cause damage and there is no danger of the drive motor being supplied continuously with an excess of current which might otherwise happen with such a construction where the ink jet head 101 is reciprocally movable along a guide shaft 125 to scan the recording paper 127 for printing. The lead wires 124 may also serve to provide an alarm when the nozzle is not covered after printing is completed, or the wires may be used to detect whether the nozzle is closed or open when intermittent ink ejections are provided to prevent the nozzle from becoming clogged as described hereinafter.

Whereas, in the embodiments of FIG. 10, the contacts 123 are held in contact with each other when the cover is away from the nozzle, the contacts may be arranged so as to be separated when the nozzle is covered, or position detection mechanisms other than these contacts may be utilized.

In the above embodiments, the cover is actuated into and out of contact with the nozzle openings directly or by way of intermediary mechanisms by manually operating a lever or button projecting through a recess 115 in the casing 110. However, in an alternative embodiment there may be no recess in the casing and the casing may be constructed of a thin sheet of plastic through which a force is transmitted by manual pressure for actuating the cover into and out of contact with the nozzle openings. Also, instead of moving the nozzle cover, the ink jet head 101 may be manually manipulated to bring the nozzle into and out of contact with the nozzle cover. It should be noted that in the embodiments of FIGS. 9,10, nozzle covers which are integral with the lever, as in the earlier described embodiments, may also be used.

Another alternative embodiment of a small size ink jet printer is described with reference to FIG. 11. The small size ink jet printer includes an ink jet head 201, ink tank 202 for supplying ink to the ink jet head 201, nozzle cover 203 of rubber having an anti-corrosive property with respect to ink, lever 204 on which the nozzle cover 203 is mounted, pawl 204*a* of the lever 204, pivot pin 205 on which the lever 204 is pivotable, spring 206, recording paper 207, platen 208, roller 209 for pressing the paper 207, external casing 210, release lever 211, roller 212 mounted on the distal end of the release lever 211, spring 213, solenoid 214, and a pin 216 about which the release lever 211 is pivotably movable. The printer also includes a recess 215 in the casing 210.

With such a construction, the lever 204 is located in the position indicated with the solid lines when the printer is not in operation and the cover 203 is pressed against the front face of the ink jet print head 201 to prevent the nozzle of the print head from becoming clogged. In a printing operation, a portion of the lever 204 which projects outwardly of the casing 210 through the recess 215 is manually moved in the direction of the arrow A pivoting around the pin 205. As the lever 204 turns, the pawl 204*a* of the lever 204 pushes against the roller 212 moving the release lever 211 angularly in the direction of the arrow B until the pawl 204*a* moves past the roller 212. The lever 211 pivots on the pin 216.

Acted on by the spring 213, the release lever 211 then returns to hold the lever 204 in the position indicated in FIG. 11 with the broken lines. The lever 204 is held in this position even after the manual force is removed from the external portion of the lever 204. With the nozzle cover 203 spaced away from the ink jet head 201, a control circuit (not shown) generates a signal to actuate the ink jet head 201 for producing a printed recording on the recording paper 207.

After the printing is completed, either a printing stop switch (not shown) is actuated, or the control circuit generates a signal in the absence of a printing signal for a predetermined period of time. The signal from the printing stop switch or the control circuit energizes the solenoid 214 which causes the release lever 211 to be angularly moved under the magnetic force about the pivot pin 216 in the direction of the arrow C until the roller 212 disengages from the pawl 204*a* of the lever 204. Thereupon, the lever 204 is caused to turn in the direction of the arrow D under the force of the spring 206, causing the cover 203 to press against the front face of the ink jet print head 201. Even when the spring 206 has a high spring force, the spring 213 may be of a low spring force such that there is encountered only a small degree of frictional force when the pawl 204*a* is disengaged from the roller 212. Therefore, the solenoid 214 may be designed or selected so that it produces a low attractive force requiring low energy input.

In the small size ink jet printer described with reference to FIG. 11, the cover 203 is releasable from its pressing engagement with the front face of the nozzle in response to manual operation effected externally of the casing 210. On the other hand, the nozzle cover 203 is automatically pressed against the front face of the nozzle after printing is completed. Even with a very high force with which the cover is held against the nozzle, the printer does not consume an increased amount of energy since the high energy requirements to extend the spring 206 are filled manually whereas the low energy requirements are drawn from the electric source. Because the force with which the nozzle covers is held against the nozzle is high, the nozzle is reliably prevented from being clogged with ink and ink is prevented from outflow from the nozzle upon impact as when the printer is dropped accidently, not an uncommon occurrence.

The solenoid 214, motor, or the like, need not be large in size and accordingly, need not be costly to manufacture as would be the case where high force is used to hold the cover against the nozzle in an all-electric system.

FIG. 12 shows an alterative embodiment of a small size ink jet printer in accordance with the invenetion. This embodiment differs from the embodiment of FIG. 11 in that the release lever 211 is not moved angularly and directly by action of the solenoid. The release lever 211 in this embodiment is normally held by a trigger lever 222. A solenoid 221 is energized when the release lever 211 is spaced from the trigger lever 222 by a gap distance 224 produced by operation of an eccentric cam 223. The condition shown in FIG. 12 is achieved after the lever 204 has been manually pushed to the left (Arrow A, FIG. 12) to separate the cover 203 from the nozzles on the print head 201. In a manner similar to the operation of the embodiment of FIG. 11, in the process of pushing the lever 204, the lever 204 moves past and is constrained by the upturned end of the release lever 211.

When the solenoid 221 is energized, the trigger lever 222 is attracted allowing the right end of the release lever 211 to pivot upwardly about the pivot pin 216 permitting the lever 204 to disengage from the release lever 211. Then, under the force of the spring 206, the lever 204 is returned by pivoting around the pin 205 to the position where the nozzle cover 203 is over and against the nozzle openings on the print head 201.

With this construction, no frictional force must be overcome by the solenoid when the trigger lever 222 is actuated out of engagement with the release lever 211. Hence, the solenoid 221 is small in size and consumes a small amount of energy. The eccentric cam 223 is driven by a small sized motor (not shown) having a better efficiency than that of the solenoid. Also, the eccentric cam may be driven by the printer drive motor (not shown) for moving the head and feeding the recording paper, etc.

It should also be understood that in alternative embodiments the print head 201 may be movable so as to come into contact with a fixed nozzle cover.

FIG. 13 is a block diagram of a circuit for use in a small size ink jet printer as shown in FIG. 10. The circuit includes power supply switches 320,321, contacts 322 which are the same as contacts 123 of FIG. 10, a main control circuit 323, a timer switch 324, OR gate 325, timer switch 326, AND gate 327, signal generating means 328 and an inverter 330. In normal printing operation, the contacts 322 and the power supply switch 320 are closed and the power supply switch 321 is open as illustrated. The main control circuit 323 effects various information procedures such as operation processing and control of the print device. Each time printing is effective, the timer switch 324 is reset. When no printing is performed for a given period of time, the timer switch 324 produces an output signal S324 as shown in FIG. 14.

The signal S324 passes the gate 325 and energizes the timer switch 326 which produces a signal S326 persisting for a given period of time, such as one minute. The signal S326 passes the gate 327 and energizes a signal generating means 328 which comprises a piezoelectric buzzer. The signal generating means 328 warns the operator that the nozzle cover is not closing the nozzles. The signal continues until the operator manually pushes the cover against the nozzle. Then, the contacts 322 of FIG. 13 are caused to open, whereupon S322 goes high to the inverter 330 and the signal S328 is rendered low by the AND gate 327 to de-energize the piezoelectric buzzer.

As stated, the foregoing operation is initiated by the timer switch 324 when no printing is effected for a given period of time. However, when the power supply switch 320 is turned off, the power supply switch 321 is turned on (closed) to give an alarm to warn the operator of his failure to close the cover.

According to the embodiment (FIGS. 10,13,14), an alarm is given by a buzzer unless the nozzle is covered when the power supply switch is turned off, or after printing has not been effected for a predetermined period of time. Thereby, the nozzle is maintained free of clogging by alerting the operator to the condition that the nozzle has inadvertently been left uncovered.

Whereas a piezoelectric buzzer is utilized to give the alarm in the described embodiment, an electromagnetic buzzer, an incandescent lamp, a light emitting diode, and a liquid crystal display may be used independently or in combination to set off an alarm signal. In selecting an alarm, one must be cognizant of the energy consumed, reliability in setting off the alarm, and like factors. For example, where no timer switch 326 is used or the timer switch 326 is set for a significantly long interval of time during which an alarm will be continuously given, signal generating means of low energy consumption, such as a liquid crystal display, should be used because the alarm is operated for a long time period or until the nozzle is covered.

Various modifications are possible for generating signals. As an example, an alarm for thirty seconds may be given once every hour until the nozzle is covered so as to reduce the consumption of energy for generating alarms and to increase reliability of setting off the alarms. It is also advantageous from the the standpoint of the cost involved in constructing signal generating means that the cover alarm may also double as a means for indicating other information.

FIG. 15 is a construction of a small size ink jet printer having a mechanism for bringing a nozzle cover into and out of contact with a nozzle in an ink jet printer head in accordance with the invention. The printer includes a printing head 401, recording paper 402, nozzle cover 403, actuator lever 404 for actuating the cover 403, a pair of contacts 405, wires 406, spring 407 for producing bi-stable conditions on the actuating lever 404, nozzle 408 and outer casing 410. A guide shaft 411 provides for translating the printing head 401 in a scanning relationship relative to the recording paper 402 and an adjacent platen 412. Ink droplets 409 are shown as they would be ejected from the printing head 401 toward the paper 402.

During a normal printing mode of operation, the lever 404 is held in the position shown in FIG. 15 by means of the spring 407, thereby closing the contacts 405. With the lever 404 thus positioned, the nozzle cover 403 is away from the nozzles 408 and the printing head 401 is caused by a drive mechanism (not shown) to move reciprocally along the guide shaft 411. In synchronism with this reciprocating movement, the printing head 401 is energized by signals from a control circuit to print on the recording paper 402. After recording has been finished, the printing unit is rendered inoperative, if necessary, by manually moving the lever 404 angularly as shown in FIG. 16 to thereby hold the nozzle cover 403 against the nozzle 408. Thereby, clogging of the nozzle is prevented and unintended outflow of ink from the nozzle is also prevented.

By manually moving the nozzle cover 403 into and out of contact with the nozzle 408, the nozzle cover can be pressed with a much higher force than would normally be done with electrical means for reliably preventing nozzle clogging. The increased force with which the cover is pressed does not result in an increase in energy consumption and does not render the device complicated, large in size or costly to manufacture because the movements are accomplished with manually applied energy.

However, the nozzle 408 tends to become clogged when the operator forgets to close the cover 403 or leaves the cover 403 open for a long time period.

FIG. 17 is a circuit for operation in association with the mechanism of FIGS. 15,16. The circuit includes contacts 420 which correspond with the contacts 405 shown in FIG. 15. A main control circuit 421 effects information processing such as processing of various inputs, and operation processing as of a calculator. The circuit also includes a printing control circuit 422 controlling the printing device, a timer switch 423, a printing head control circuit 424 for controlling the printing head, a driver 425, a piezoelectric element 426 serving as a source of driving energy for the ink jet printing head, a discharge resistor 427, an inverter 428, AND gates 429,430, and OR gate 431.

For normal printing operation, the switch 420 is closed and the main control circuit 421 produces a signal to energize the driver 425 via the printing device control circuit 422 and the printing head control circuit 424. Thereupon, the piezoelectric element 426 is energized to cause the printing head to eject ink droplets 409 for recording. When the cover is closed as shown in FIG. 16 to leave the contacts 405 (contacts 420 in FIG. 17) open, the printing control circuit 422 is not energized even when commanded by the main control circuit 421 to effect printing because the output of the gate 429 is low. This prevents the printing device from being actuated while the nozzle cover 403 is pressed against the nozzle, thus avoiding damage to the printing device and a continued flow of an excessive current through a motor (not shown) for actuating the device.

Operation of the printing device when the cover remains open after normal printing operations have been completed is now described with reference to FIG. 18. Output signals from the circuit components in FIG. 17 are indicated in FIG. 18 as S422,S423,S420,S424. When a selected interval of time T1 has elapsed after printing has been finished, the timer switch 423 produces a high signal S423 for an interval of time T2. The signal passes the gates 430,431 and energizes the printing head control circuit 424 which generates a signal S424 that is applied to the driver transistor 425 to effect ink ejection by actuation of the piezoelectric element 426. While the cover remains open, the contacts 420 are closed causing a signal S420 to be in the low state. Upon passage of another interval of time T1, the timer switch 423 again produces a high signal which endures for a time interval T2. Thus, intermittent ink ejection is effected.

As stated, when the operator forgets to close the nozzle cover 403, ink is ejected at predetermined intervals of time, thereby preventing the nozzle 408 from becoming clogged. When the cover is manually closed after a certain interval of time, the signal from the contacts 420 goes high as indicated at S420, preventing a signal from being applied to the driver 425 as shown at S424. Therefore, no ink is ejected while the nozzle is covered.

The intervals of time T1,T2 are selected dependent upon the design of the printing head, the ink which is used, and the like. Generally, T1 is desirably as short as possible; T2 is desirably as long as possible from the standpoint of preventing clogging of the nozzle. Conversely, T1 should be longer and T2 should be shorter for a reduced amount of ink and energy consumption and for preventing the recording paper and the device generally from getting ink stains. In the embodiment illustrated, T1 is twelve hours and T2 is five milliseconds.

While in the illustrated embodiment (FIGS. 15–18), the main control circuit 421, the printing device control circuit 422, the printing head control device 424 and the like are shown separately in FIG. 17 for ease of description, it should be readily understood that these controls may be integrally packaged. The polarity of currents for operation of the contacts 405 and the driver 425 may be selected so as to be advantageous for practical application purposes, and accordingly, the illustrated embodiments should not be interpreted as limiting the invention.

In an alternative embodiment ink ejection is effected after the passage of a preselected interval of time has elapsed and a piezoelectric buzzer, a light emitting diode or the like is also used to warn against the cover remaining open. Such arrangement assures more reliable prevention of clogging although it is more costly.

When left with the cover off for a long period of time, energy is consumed for ejecting ink, but it is only a few microjoules at most which are consumed, and accordingly, no problem is caused with ink jet heads of the ink-on-demand type. No problems of energy consumption would be experienced generally speaking where the printing device is not actuated and ink is ejected only at infrequent intervals as in the embodiment shown in FIG. 17.

The recording paper 402 or the printing head 401 may become stained when ink is ejected over extended periods of time. To resolve such a problem, the printing device can be actuated simultaneously with ink ejection for feeding the paper along, thus preventing the paper or printing head from being stained. Where the platen 412 (FIG. 15) is made of a porous material capable of absorbing ink, excess ink can be absorbed whether there is recording paper 402 present or not. Thereby, the overall printing device is prevented from being stained as the ink is absorbed before it can spread undesirably.

In the illustrated embodiment (FIGS. 15,16) the contacts 405 detect whether the cover is open or closed, and the printing device is not actuated when the cover is closed. Stated otherwise, the mechanism for bringing the cover into and out of contact with the nozzle serves as a switch for operating the printing device. However, as an alternative embodiment, there may be no such contacts 405 and the printing head 401 may be actuated upon passage of a given interval of time regardless of whether the cover is open or closed after printing operation has been completed. When the cover is open, ink can be ejected, but when the cover is closed no ink can be ejected. With this arrangement, the contacts can be eliminated although energy consumption is increased.

In summary, even if the operator forgets to close the nozzle cover, ink is ejected intermittently to prevent the nozzle from becoming clogged with ink. This is a great advantage for a portable small sized printing device powered by a battery.

It will thus been seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a small printer device having an ink jet print head of the ink-on-demand type including a nozzle, the improvement therein comprising:

nozzle cover means for pressing against and blocking the discharge opening of said nozzle;

means for moving said nozzle cover means between a first position and a second position, said nozzle being blocked by said nozzle cover means in said first position and being unobstructed by said nozzle cover means in said second position;

a timer, said timer being in circuit with said print head and adapted to commence operation after printing is completed and to generate a signal after a preselected interval of time;

at least one supplemental function, said at least one supplemental function, when enabled, being subject to performance upon ocurrence of said timer signal; and means for enabling said at least one supplemental function, said means for enabling cooperating with said nozzle cover means, said at least one supplemental function being enabled only when said nozzle cover means is in said second position.

2. A small size printer device as claimed in claim 1, wherein said means for enabling includes electrical switching means, movement of said nozzle cover means between said positions being adapted to actuate said switching means, said switching means actuating electrical circuitry controlling at least said print head and in one position of said cover means causing enablement of said at least one supplemental function.

3. A small size printer device as claimed in claim 1 and further comprising an external casing, said means for moving said nozzle cover is substantially within said casing when said nozzle cover means presses against said nozzle opening, and a portion of said means for moving is located externally of said casing and extends a substantial distance away from said casing when said nozzle cover means is in said second position.

4. A small size printer device as claimed in claim 3, and further comprising a carrying cover, said carrying cover being adapted to at least partially enclose said printing device for carrying and to press against said external part of said means for moving said nozzle cover, said external part of said means for moving being subject to being forced to said first position by covering said printer device with said carrying cover, whereby said print head neither clogs nor leaks while carried in said carrying cover.

5. A small size printer device as claimed in claim 1, wherein said means for moving said nozzle cover, is adapted for manual operation in moving said nozzle cover between said first and second positions, and includes means for automatic return of said nozzle cover from said second position to said first position after printing is completed.

6. A small size printer device as claimed in claim 5, wherein said means for automatic return includes a solenoid device.

7. A small size printer device as claimed in claim 5, wherein said means for automatic return includes a spring device.

8. A small size printer device as claimed in claim 1, and further comprising:

a driver for driving said ink jet print head, said driver being one said supplemental function and adapted, when enabled, to respond to said timer signal and drive said ink jet head after said selected time interval.

9. A small size printer device as claimed in claim 8, wherein said means for enabling includes detecting means for sensing whether said nozzle cover means is in said first or second position, said driver driving said ink jet print head in response to said timer signal only when said nozzle cover means is detected in said open second position.

10. A small size printer device as claimed in claim 8, and further including an ink absorbing member disposed in opposed relationship to said nozzle for receiving ink ejected from said nozzle, said ink absorbing member being spaced away from said nozzle, said intervening space being suitable for receiving recording paper therebetween.

11. A small size printer device as claimed in claim 8, and further comprising warning means, said warning means being another said supplemental function and adapted, when enabled, to produce a warning upon the concurrence of said timer signal.

12. A small size printer device as claimed in claim 1, wherein one said supplemental function is warning means, said warning means being adapted to produce a warning upon the occurrence of said timer signal when said nozzle cover is in said second position.

13. A small size printer device as claimed in claim 11 or 12, wherein said warning means includes one of a audible and visible indicator.

14. A small size printer device as claimed in claim 5 or 7, wherein said means for automatic return is adapted to operate when the manual pressure causing said nozzle cover to move from said first to said second position is removed.

* * * * *